United States Patent [19]

Wakabayashi

[11] Patent Number: 5,392,899
[45] Date of Patent: Feb. 28, 1995

[54] DRIVE WHEEL CONVEYOR
[75] Inventor: Takao Wakabayashi, Osaka, Japan
[73] Assignee: Nakanishi Metal Works Co., Ltd., Osaka, Japan
[21] Appl. No.: 164,706
[22] Filed: Dec. 10, 1993
[51] Int. Cl.6 .......................................... B65G 13/02
[52] U.S. Cl. .................................... 198/780; 198/790
[58] Field of Search ...................... 198/780, 789, 790; 193/37

[56] References Cited

U.S. PATENT DOCUMENTS

| | | | |
|---|---|---|---|
| 1,323,171 | 11/1919 | Donald | 193/37 |
| 2,110,942 | 3/1938 | Piquerez | |
| 2,887,203 | 5/1959 | Baron | 193/37 |
| 3,327,837 | 6/1967 | Covell | 198/789 |
| 3,608,876 | 9/1971 | Leaich et al. | 198/789 X |
| 3,961,700 | 6/1976 | Fleischauer | 198/790 |
| 4,131,420 | 12/1978 | Miller | |
| 4,339,158 | 7/1982 | Greener et al. | 193/37 X |
| 4,479,572 | 10/1984 | Merz | 198/790 X |
| 4,955,462 | 9/1990 | Bilodeau et al. | 193/37 |
| 5,080,219 | 1/1992 | Imai et al. | 198/789 X |

FOREIGN PATENT DOCUMENTS

| | | |
|---|---|---|
| 0051869 | 5/1982 | European Pat. Off. . |
| 0294498 | 12/1988 | European Pat. Off. . |
| 0327652 | 8/1989 | European Pat. Off. ............ 198/790 |
| 156209 | 3/1969 | France . |
| 63-77911 | 5/1988 | Japan . |
| 0285515 | 11/1989 | Japan ................................. 198/790 |
| 2156299 | 10/1985 | United Kingdom ................ 198/789 |

Primary Examiner—D. Glenn Dayoan
Attorney, Agent, or Firm—Armstrong, Westerman, Hattori, McLeland & Naughton

[57] ABSTRACT

A drive wheel conveyor having a tubular side frame extending in a transport direction and having an inner side wall, outer side wall, top wall and bottom wall; a drive shaft supported by the inner and outer side walls so as to extend through the side frame transversely thereof and having an inward projection extending inward through the inner side wall; a sprocket fixed to the drive shaft and positioned between the inner and outer side walls; an endless drive chain in engagement with the sprocket and disposed inside the side frame so as to be movable in circulation; and a transport wheel having a shaft bore with the inward projection fitted therein and drivable by frictional resistance between the inner periphery of the wheel defining the shaft bore and the outer surface of the inward projection.

4 Claims, 2 Drawing Sheets

DRIVE WHEEL CONVEYOR

BACKGROUND OF THE INVENTION

The present invention relates to drive wheel conveyors, for example, for use in assembly lines for motor vehicles or household electric appliances for transporting parts carrying pallets or the like so that the pallet or the like can be temporarily stopped during transport.

Such conveyors are already known which comprise, for example as disclosed in JP-A 63-77911, a side frame of U-shaped cross section having an inner side wall, an outer side wall and a bottom wall and extending in a transport direction, a drive shaft supported by the inner and outer side walls so as to extend through the side frame transversely thereof, a sprocket fixed to the drive shaft and positioned between the inner and outer side walls, an endless drive chain in engagement with the sprocket and disposed inside the side frame so as to be movable in circulation, and a transport wheel having the drive shaft fitted in a shaft bore therein between the inner side wall and the sprocket and drivable by frictional resistance between the bore-defining inner peripheral surface of the wheel and the outer surface of the drive shaft.

When the conveyor is viewed from above, the transport drive mechanism including the sprocket and the drive chain is left exposed. This entails the likelihood that the worker will be caught by the drive mechanism, which is therefore hazardous. Further if a bolt, rubbish, or like extraneous matter, falls into the frame and engages in the drive mechanism, a problem will occur. Another problem is encountered in that the drive mechansim spatters oil on the worker or the workpiece being transported.

SUMMARY OF THE INVENTION

The main object of the present invention is to provide a drive wheel conveyor which is free of the above problems.

The present invention provides a drive wheel conveyor which comprises a tubular side frame extending in a transport direction and having an inner side wall, an outer side wall, a top wall and a bottom wall; a drive shaft supported by the inner and outer side walls so as to extend thorough the side frame transversely thereof and having an inward projection extending inward through the inner side wall; a sprocket fixed to the drive shaft and positioned between the inner and outer side walls; an endless drive chain in engagement with the sprocket and disposed inside the side frame so as to be movable in circulation; and a transport wheel having a shaft bore with the inward projection of said drive shaft fitted therein and drivable by frictional resistance between an inner peripheral surface of the wheel defining the shaft bore and the outer surface of the inward projection.

With the drive wheel conveyor of the present invention, the drive shaft extends inward through the inner side wall to provide the projection, which is fitted in the shaft bore of the transport wheel, and the side frame has the top wall extending between and attached to the upper ends of the inner and outer side walls. Although the transport wheel is left exposed from the side frame, the sprocket and the chain are therefore covered with the side frame.

Accordingly, the transport wheel is operable free of trouble for transporting workpieces, while there is no likelihood that the worker will be caught by the drive mechanism, hence greater safety is effected. It is also unlikely that a bolt, rubbish or like extraneous matter will fall into the frame and engage in the drive mechanism. Moreover, the working oil spattering from the drive mechanism is unlikely to soil the worker or the workpiece being transported.

DESCRIPTION OF THE PREFERRED EMBODIMENT

An embodiment of the present invention will be described below with reference to the drawings.

Figure 1:
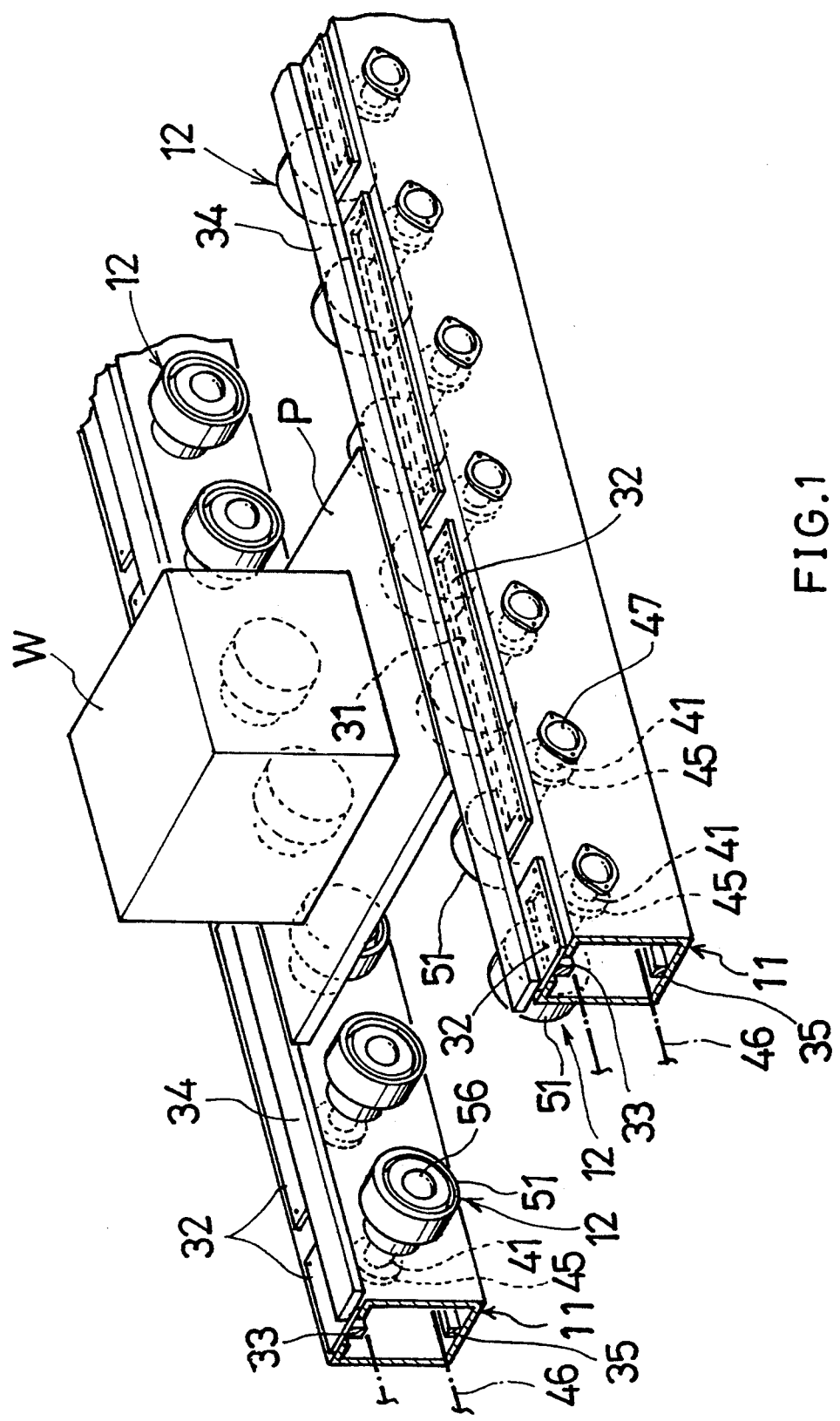
FIG. 1 is a perspective view of a conveyor embodying invention.

FIG. 1 shows a drive wheel conveyor which comprises a pair of opposite side frames 11 extending longitudinally of the conveyor and each in the form of a tube of rectangular cross section, and a pair of opposite rows of transport units 12 which rows are provided on the respective side frames 11. Pallets P carrying workpieces W thereon are supported at their opposite sides by these rows. The transport units 12 in each row are arranged at a spacing longitudinally of the side frame 11.

Figure 2:
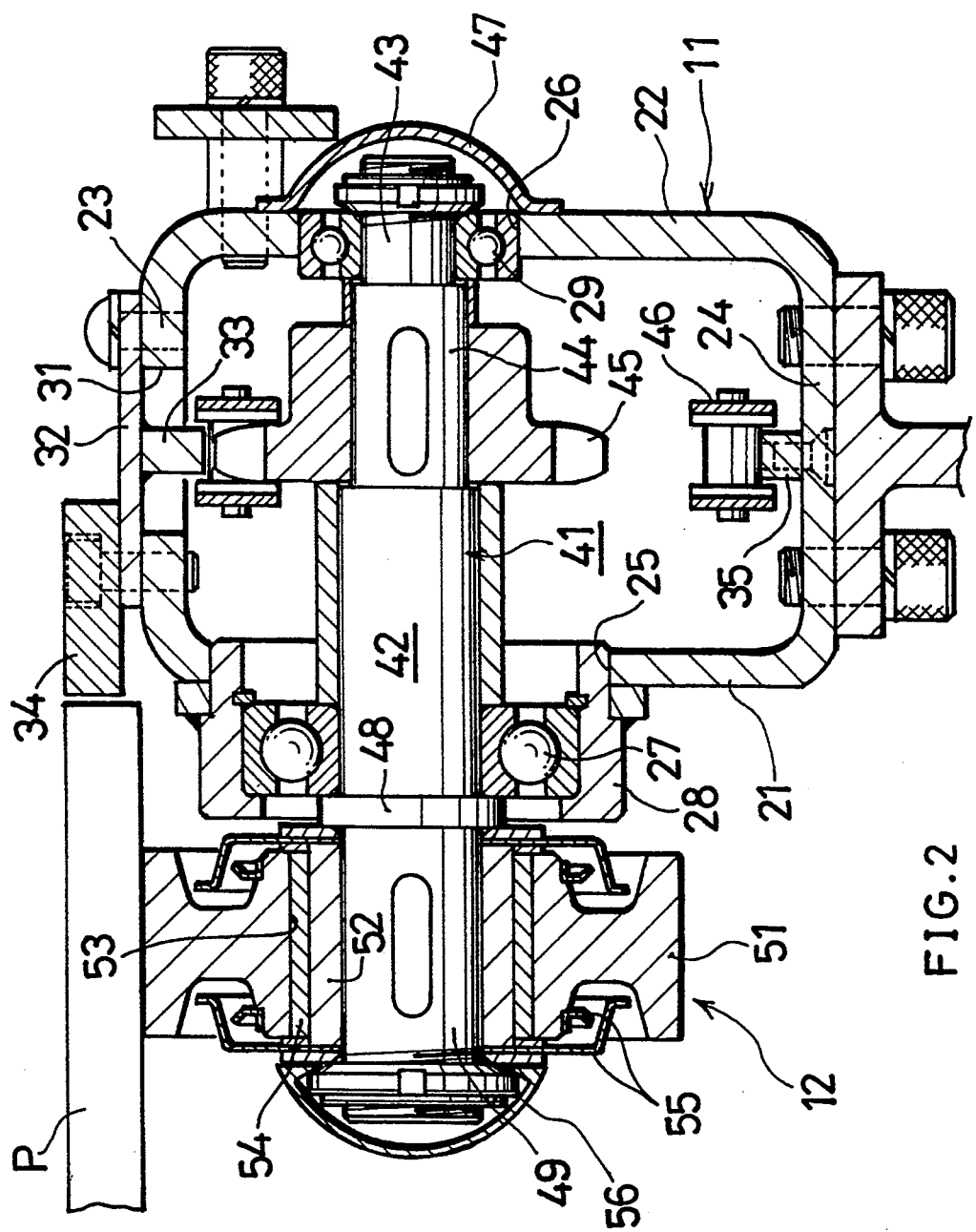
FIG. 2 is a cross sectional view of a side frame and a transport unit which are included in the conveyor.

The opposite side frames 11, as well as the rows of transport units 12, are of the same construction although oriented in different directions, so that the following description will be given of the right side frame 11 and one transport unit 12 shown in FIG. 2.

The side frame 11 is in the form of a rectangular tube extending longitudinally of the conveyor, and comprises an inner side wall 21, outer side wall 22, top wall 23 and bottom wall 24. The inner side wall 21 has a large bearing hole 25, and the outer side wall 22 is formed with a small bearing hole 26, these holes 25, 26 being arranged concentrically. A large bearing 27 is fitted in the large bearing hole 25 with a housing 28 provided between the bearing and the side wall, while a small bearing 26 is fitted directly in the small bearing hole 26. The top wall 23 is centrally formed with a slit 31 extending longitudinally thereof. The slit 31 is closed with a cover 32, which is provided with an upper chain guide rail 33 depending therefrom. A pallet guide 34 is attached to the upper surface of the cover 32 at its inner end. A lower chain guide rail 35 is provided on the upper surface of the bottom wall 24 centrally thereof.

The transport unit 12 has a drive shaft 41 extending through the side frame 11 transversely thereof. The drive shaft 41 includes a large-diameter portion 42 positioned at the middle of its length and supported by the large bearing 27, a small-diameter portion 43 close to the shaft outer end and supported by the small bearing 29, and a medium-diameter portion 44 between the large-diameter portion 43 and the small-diameter portion 43. A sprocket 45 is fixed to the portion 44 with a key. An endless chain 46 extending inside the side frame 11 longitudinally thereof has a portion thereof engaged with the sprocket 45 when traveling along an upper path. The outer end of the small-diameter portion 43 is covered with a metal cap 47. The large-diameter portion 42 has an inner end provided with a flange 48 and extending into an inward projection 49, which carries a transport wheel 51 thereon. More specifically, a friction ring 52 is fixed to the inward projection 49 with a key. The transport wheel 51 is formed with a shaft bore 53 having a bronze bush 54 inserted therein with a press fit. The bush 54 is slidably fitted around the friction ring 52. Provided between the inward projection 49 and the transport wheel 51 are dust seals 55 for covering a clearance between the outer surface of the friction ring 52 and the inner surface of the bush 54 to prevent extraneous matter from ingressing into the clearance. The inner end of the inward projection 49 is covered with a rubber cap 56.

The inside diameter of the large bearing hole 25 is greater than the outside diameter of the sprocket 45. When the conveyor is assembled, the sprocket 45 is inserted into the side frame 11 through the large bearing hole 25. After the chain 46 has been engaged with the sprocket 45, the top cover 32 is attached to the side frame 11. Thus, a clearance sufficient to pass only the chain 46 therethrough is formed between the sprocket 45 and the guide rail 33. This obviates the likelihood of the chain 46 becoming disengaged from the sprocket 45.

When the sprocket 45 is drivingly rotated by the chain 46, the drive shaft 41 rotates to drivingly rotate the transport wheel 51 by virtue of the frictional resistance between the outer surface of the friction ring 52 and the inner surface of the bush 54.

When no external force acts on the pallet P as placed on the transport wheel 51, the pallet P is sent forward with the rotation of such transport wheels 51, whereas if the pallet P is subjected to an external force acting in a direction to hamper the movement of the pallet P, a slip occurs between the friction ring 52 and the bush 54 to stop the pallet P.

With the construction described above, the drive mechanism other than the transport wheel 51, namely, the driveshaft 41, the sprocket 45 and the chain 46 are all covered with the side frame 11. Accordingly, there is no likelihood of the worker becoming caught by the drive mechanism, nor is there any likelihood of extraneous matter ingressing into the side frame. Of course, the drive mechanism will not spatter oil or the like on the worker or the article being transported.

What is claimed is:

1. A drive wheel conveyor comprising:

a tubular side frame extending in a transport direction and having an integrally formed inner side wall, outer side wall, top wall and bottom wall which extend continuously throughout substantially the entire length of said frame to form an enclosure structure, a drive shaft supported at axially spaced locations by the inner and outer side walls so as to extend through said enclosure structure of the side frame transversely thereof and having an inward projection extending inward through the inner side wall, a sprocket fixed to the drive shaft and positioned within said enclosure structure between the inner and outer side walls thereof, an endless drive chain in engagement with the sprocket and disposed inside the enclosure structure defined by said side frame so as to be movable in circulation, a transport wheel having a shaft bore with the inward projection fitted therein and drivable by frictional resistance between an inner peripheral surface of the wheel defining the shaft bore and the outer surface of the inward projection, said top wall being formed with a slit extending in the transport direction, a top cover attached to an upper surface of the top wall to close the slit, and a chain guide being attached to and depending from a lower surface of the top cover.

2. A drive wheel conveyor as defined in claim 1 wherein the inner side wall is formed with a bearing hole in the portion thereof where the drive shaft extends through the inner side wall, and a bearing having the drive shaft extending therethrough is fitted fitted in the bearing hole by a housing.

3. A drive wheel conveyor as defined in claim 1 wherein the drive shaft has inner and outer ends each covered with a safety cap.

4. A drive wheel conveyor as defined in claim 1 wherein a clearance between the bore-defining peripheral surface and the outer surface of the inward projection has inner and outer ends each covered with a dust seal.

* * * * *